(12) United States Patent
Herzig

(10) Patent No.: US 7,706,990 B2
(45) Date of Patent: Apr. 27, 2010

(54) SYSTEMS AND METHODS FOR MEASURING UTILIZED GENERATION OF AT-PREMISE RENEWABLE POWER SYSTEMS

(76) Inventor: Michael Herzig, 2787 Route 9, Cold Spring, NY (US) 10516

( * ) Notice: Subject to any disclaimer, the term of this patent is extended or adjusted under 35 U.S.C. 154(b) by 176 days.

(21) Appl. No.: 11/928,115

(22) Filed: Oct. 30, 2007

(65) Prior Publication Data

US 2009/0112758 A1    Apr. 30, 2009

(51) Int. Cl.
*G01R 21/00* (2006.01)

(52) U.S. Cl. ............ 702/62; 702/188; 700/286

(58) Field of Classification Search ........ None
See application file for complete search history.

(56) References Cited

U.S. PATENT DOCUMENTS

| | | | |
|---|---|---|---|
| 3,872,286 A * | 3/1975 | Putman | 705/412 |
| 4,752,697 A * | 6/1988 | Lyons et al. | 290/2 |
| 6,311,137 B1 | 10/2001 | Kurokami | |
| 7,133,787 B2 | 11/2006 | Mizumaki | |
| 2002/0033020 A1 * | 3/2002 | Tonomura et al. | 60/641.8 |
| 2002/0143693 A1 * | 10/2002 | Soestbergen et al. | 705/37 |
| 2004/0103056 A1 | 5/2004 | Ikeda | |
| 2004/0138977 A1 | 7/2004 | Tomkins | |
| 2004/0148336 A1 * | 7/2004 | Hubbard et al. | 709/202 |
| 2004/0177027 A1 | 9/2004 | Adachi | |
| 2006/0271214 A1 | 11/2006 | Brown | |
| 2007/0162367 A1 | 7/2007 | Smith et al. | |
| 2008/0091625 A1 * | 4/2008 | Kremen | 705/412 |
| 2008/0215500 A1 | 9/2008 | De La Motte | |

FOREIGN PATENT DOCUMENTS

| | | | |
|---|---|---|---|
| WO | WO 0225987 A2 | 3/2002 | |
| WO | WO 2006119113 A2 | 11/2006 | |

* cited by examiner

*Primary Examiner*—Manuel L Barbee
(74) *Attorney, Agent, or Firm*—Jennifer Meredith; Meredith & Keyhani, PLLC

(57) ABSTRACT

A computer processor implemented method of measuring utilized generation of at least one at-premise power system to a consumer, the method comprising the steps of; providing at least one at-premise renewable power system, at least one meter in communication with at least one said at premise renewable power system and at least one wireless communication node in communication with at least one meter; determining usage from each meter, wherein at least one of the meters collects usage data from at least one at-premise renewable power system. A first meter collects data input from a pulse meter to provide primary input, a second meter collects data input from a secondary source meter to provide secondary input and the utilized generation is arrived at by subtracting the secondary input from the primary input.

4 Claims, 2 Drawing Sheets

NODE (100)   HUB (102)   SERVER (104)

Nodes connect wirelessly to the Hub, and are able to record pulses (for water flow) as well as watts/current (for electric water heaters).

Hubs receive their information wirelessly from the nodes and transmit it over the internet to the Server.

Calculations are done centrally at the server, reducing the cost/complexity of the Hubs and Nodes, and increasing flexibility

SYSTEMS AND METHODS FOR MEASURING UTILIZED GENERATION OF AT-PREMISE RENEWABLE POWER SYSTEMS

The present invention relates to systems and methods for measuring utilized generation of at premise renewable power systems.

Many different types of panels and/or systems provide the ability to generate energy from solar power; however, many consumers find the initial payout to be prohibitive. This is because the up-front cost of solar panels/systems is higher in terms of fixed components than other sources of energy. For example, photovoltaic panels (which generate electricity directly from sunlight) are very expensive since they usually require microchip grade silicon. Therefore, the cost of panels for an average house may run from $15,000 to $35,000 (or more), not including what are often substantial installation fees. Solar Hot Water systems tend to be somewhat less expensive, but still run from $5,000 to $10,000 not including installation. These costs must then be compared to competing sources of power. The competing system for photovoltaic panels is connecting to the local grid. This is usually included in the base price of the house, and therefore is considered to be negligible for most consumers. Solar Hot Water heaters compete with gas/oil/electric heater and heat pumps. These are all lower priced than the Solar Hot Water systems by a factor of two or three (or more), which is critical since they are generally installed by a developer who does not benefit from the ongoing cost savings of solar power. Also, replacement usually occurs when a system breaks, and therefore the goal is a quick replacement instead of a long term investment.

Because of these cost considerations, solar panels/systems are not currently as widely used by consumers as they might otherwise be. Nonetheless, these systems have the following important benefits: they do not rely on fossil fuels which create greenhouse gases as well as other pollution; they get their energy from the sun which is a renewable resource that is freely available to all; they reduce the additional usage of fossil fuels required to transport fuels to users premises to create heat (in the case of Solar Hot Water systems); they create energy at the point of usage, creating efficiencies in transmissions; they are generally durable systems which pay for themselves over time and then can be used after they have been amortized; they decrease the demand for fuels from volatile areas of the globe; and they decrease the need for destroying natural habitats required to extract fuels.

Over the past decade, rising greenhouse gases have been directly related to an increase in global warming. This is now established scientific fact which could have grave concerns if it continues to rise unabated. This further underlines the benefit of solar panels/systems which reduce the need to generate power with fossil fuels that contribute to this issue. The realization of the Federal, State and some Local governments that fossil fuels create both environmental as well as geopolitical issues has led to a broad set of incentives at all levels. These change on a regular basis, but one example is a current federal energy bill that provides a tax credit worth up to 30 percent of the cost of residential solar panels. The credit is capped at $2,000 but can be combined with other incentives. With or without government support, consumers have had the ability to purchase solar power systems for years. The traditional method of purchasing a system and then seeking the Federal, State and Local credits suffers from drawbacks and limitations. The initial expense is often prohibitively large, with up-front costs that are beyond the means of many consumers, even if they were able to recoup the costs over time. If consumers had the option to purchase energy generated from solar panels/systems on their premises as it was generated rather than as an up front fixed cost, this would not only benefit the consumer in terms of long term energy pricing, but would also provide the environmental and national benefits as described above.

The primary types of solar systems are electric (photovoltaic) and thermal (generally for hot water). The technology for thermal systems matured relatively quickly, and these produced (and continue to produce) the highest energy content for surface area covered by the panels. The issue with them being more widely adopted has to do with price competition with inexpensive hot water heaters and the economics of how water heaters are purchased (as noted above). The technology for photovoltaic systems continues to advance with several breakthroughs likely in the next few years as start-up companies seek to mass produce panels that do not require expensive silicon. If successful, this could revolutionize the industry. Even if these technologies take longer to develop than expected, there are several other developments which enable the creation of more efficient panels while using much less silicon. Finally, annually increasing demand is leading to the creation of additional manufacturing facilities which will likely reduce prices in the long term.

Many more Consumers would likely use locally based renewable power systems if they did not require such a relatively large upfront investment. One way to increase usage would be to enable consumers to pay for such systems based upon usage, similar to the process that most people use with their existing utility.

Generally, the purchase of energy today by consumers and small businesses takes place locally with each utility (based on local rules and regulations) setting its own rates. The local utilities' billing systems are specialized according to their requirements; these systems are generally inflexible, treating all customers of a certain type (e.g. residential vs. commercial) according to the same terms.

Utilities generally charge for energy based on Kilowatt Hours (KwH) or according to BTUs for natural gas. Each unit has a price, which is then adjusted according to delivery charges, surcharges, taxes and other fees. Based on energy usage for a given period (generally one month), the customer is then billed by the utility. This system works well for the utilities since most customers are charged similar rates throughout the service area, and billing/collections follow that specific utility's rules, which are in term based on local rules/regulations.

As renewable energy becomes a higher priority worldwide, governments at federal, state and even local levels are creating incentives for people who install renewable energy systems at their premises. These incentives can at times equal over half of the cost of the system, including installation, which then makes the power generated competitive with that offered by the conventional (fossil fuel) sources. These incentives also vary significantly between residential and business users, small and larger systems and even how a system is installed (e.g. whether it is grid-tied). They also vary frequently as government policy changes.

As at-premise renewable power becomes more popular, companies may offer it as a service (i.e. these companies will own the renewable energy systems and charge customers usage fees for the power generated from their at-premise systems). Systems and methods for measuring usage, so that consumers may be billed according to such usage are accordingly needed.

In addition to allowed for billing according to usage, there are several additional reasons to regularly measure the amount of energy generated by a solar power system. This includes monitoring for system function/efficiency, determining if the system is meeting and/or exceeding the anticipated generation in its payback calculation, creating data which can be used to qualify for government credits and incentives, and also demonstrating clean generation which can be used for carbon offset credits.

Also, for grid-tied systems (those which connect directly back into the power grid), an at premises electric meter actually shows any power returned to the grid, as well as what is offset by the solar-electric system. Essentially, for these systems, any power generated and not lost through the inverter will be used either by the premises or the grid. Therefore, all power measured can be considered utilized and payback/efficiency calculations are relatively straightforward. For Solar Hot Water systems, measuring the utilized power is more complicated. This is due to two reasons. First, power generated by the Solar Hot Water system which is not immediately used is relatively difficult to store. Storage is limited to the available tanks. Therefore, not all hot water generated is actually useful to the consumer. Secondly, optimizing the configuration usually requires some reliance on a secondary system (either electric or oil/gas based) so that the location constantly has available hot water. Therefore, simply measuring the hot water coming from the water tank does not accurately reflect the energy generated from the solar panels.

Accordingly, the present invention provides system and methods for measuring utilized generation by at premise renewable power systems including solar hot water systems.

These and other features, aspects and advantages of the present invention will become better understood with reference to the following description and claims.

SUMMARY OF THE INVENTION

The present invention relates generally to systems and methods for measuring utilized generation of at premise renewable power systems.

A system for measuring the power from an at-premise renewable Power System as it is generated at a consumer's premises, the system comprising: at least one at-premise renewable power system, wherein the at-premise renewable power system is at least partially powered by at least one alternate energy source; at least one meter in communication with each at least one at-premise renewable power system, wherein at least one meter measures usage by each at-premise renewable power system; at least one data hub; at least one computer processor implemented data server in communication with each at least one data hub; at least two communication nodes in communication with each meter, wherein each communication node transmits usage to at least one data hub, and each at least on data hub transmits usage to at least one server and at least one computer processor implemented data server calculates the utilized generation of the at-premise renewable power system.

A method of measuring utilized generation of at least one at-premise power system to a consumer, the method comprising the steps of; providing at least one at-premise renewable power system, at least one meter in communication with at least one said at premise renewable power system and at least one wireless communication node in communication with at least one meter; determining usage from each meter, wherein at least one of the meters collects usage data from at least one at-premise renewable power system.

These and other features, aspects and advantages of the present invention will become better understood with reference to the following description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
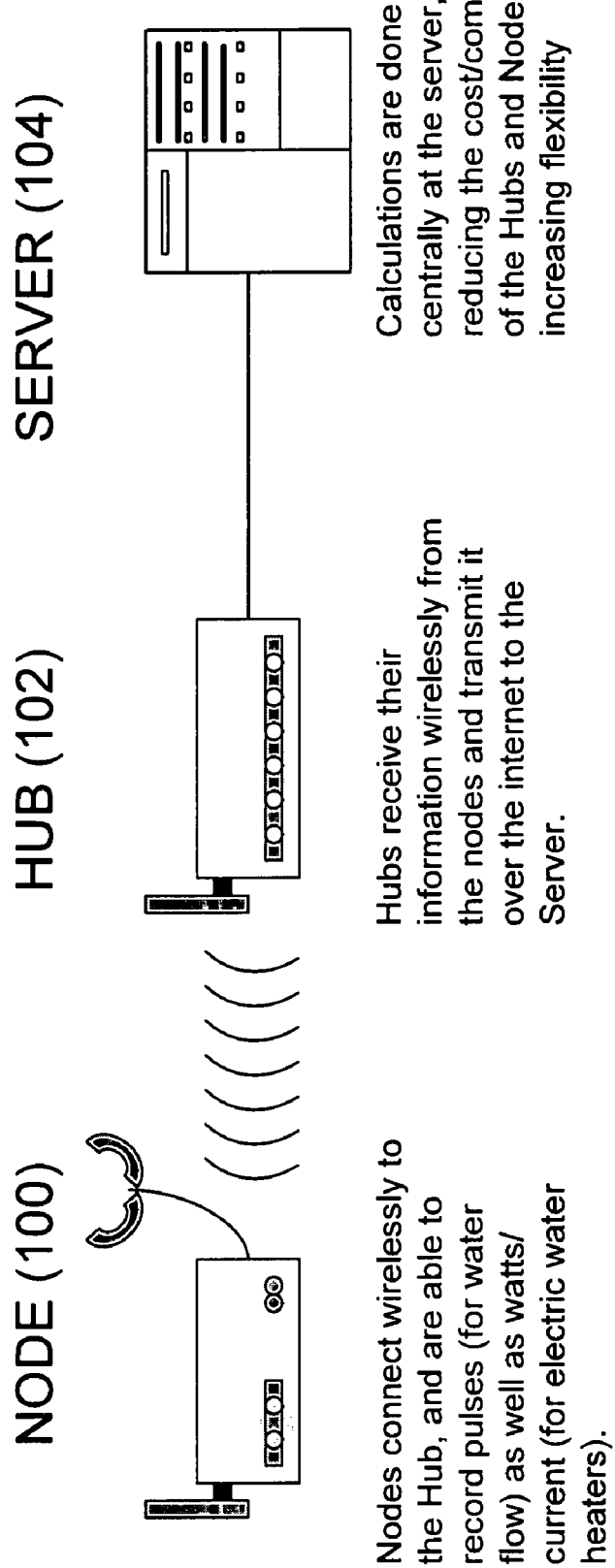
FIG. 1 depicts the present invention.
Figure 2:
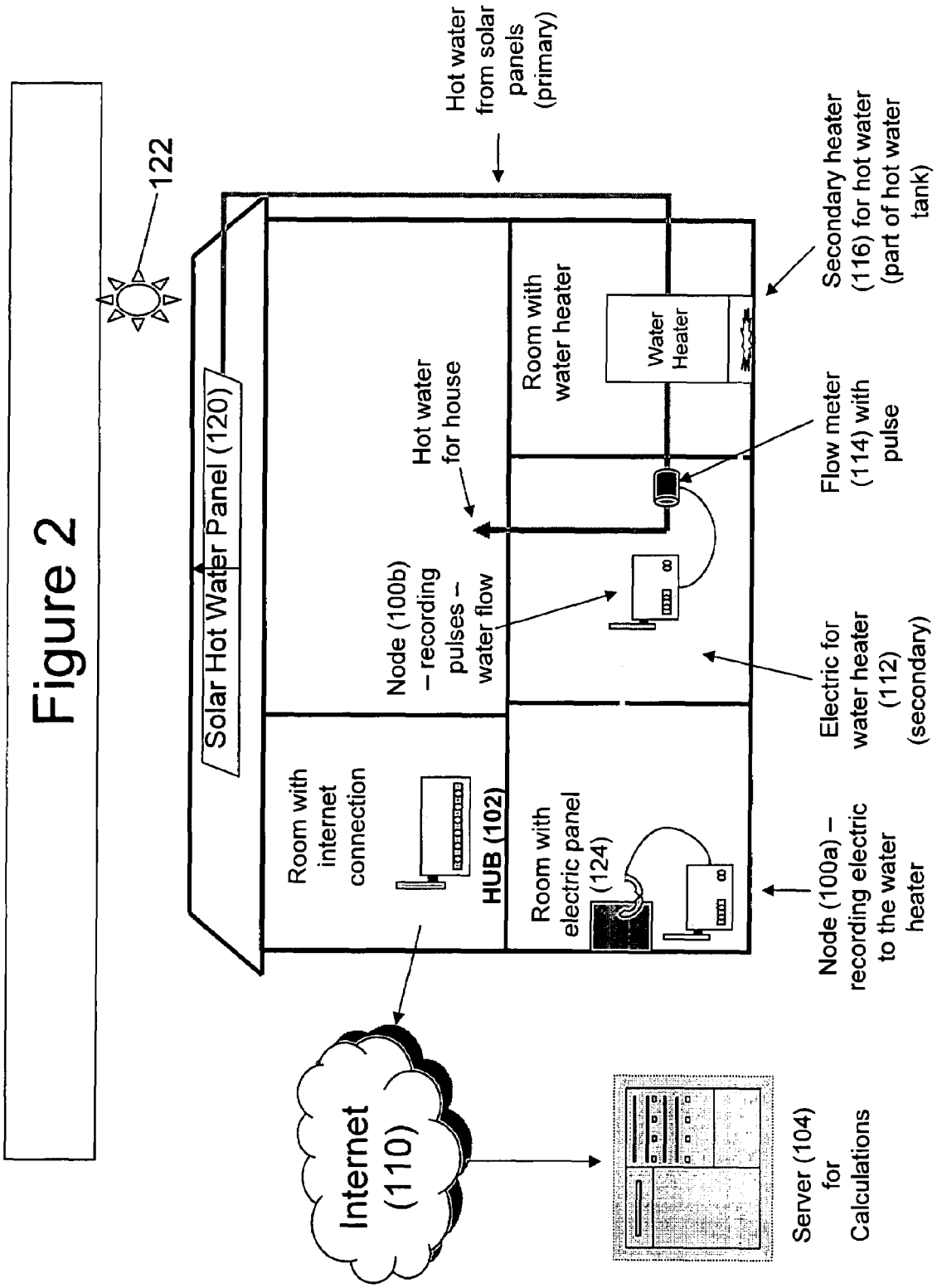
FIG. 2 depicts the present invention.

With reference to FIGS. 1-2, a system for measuring an at-premise renewable Power System (e.g. solar hot water panel (120)) as it is generated at a consumer's premises is provided, the system comprising: at least one at-premise renewable power system (120), wherein the at-premise renewable power system (120) is at least partially powered by at least one alternate energy source (such as the sun 122); at least one meter (114) in communication with each at least one at-premise renewable power system (120), wherein each meter (e.g. 114) measures usage by each at-premise renewable power system (120); at least one data hub (102); at least two communication nodes (100a and 100b) in communication with each meter (100a is in communication with the electric panel (124) which meters the electricity being delivered to as a secondary source and 100b is in communication with flow meter 114) wherein each communication node (100a and 100b) transmits usage to at least one data hub (102). Each data hub (102) transmits usage to at least one server (104) and at least one computer processor implemented data server (104) calculates the utilized generation of the at-premise renewable power system. This may be calculated according to the formula discussed herein.

The at-premise renewable Power System may be, for example, a solar system, solar panel system, photovoltaic, thermal, wind powered, geothermal, hydropower. The secondary energy source is in communication with and at least partially powering the at least one at-premise renewable power system. It should be understood, though, this is only for ancillary power in the event that the alternate energy source (122) is not capable of entirely powering the at premised renewable power system.

The meter may be any type of meter, by way of example, this may include a pulse meter, temperature meter, electromechincal meter, solid state meter, flow meter, electric meter, energy meter and watt meter. Each installation of the Invention will have a Data Hub set up at the location with the Solar Hot Water system. These devices connect to the internet and send the data collected by the Nodes to the Server. They have the following properties: The Hub has a web server and connects to a standard internet connection (Ethernet). It does not require a computer or other device to make this connection. Each Hub has its own unique IP or DNS address. The Hub is configured by a web browser. The web browser allows the hub to have specific Nodes assigned to it. This set up feature will allow another Hub in the area to be set up with its own Nodes so that all can operate wirelessly without disruption. Also, the hub is able to configure specific aspects of the Hub, such as the connection with the server, data recording and time settings and the ability to configure the attached Nodes, including their recording properties.

The Hub may connect wirelessly to the various Nodes in its network and may handle several Nodes, sending up the data of each within a separate data stream to the server. Typically the hub would plug into a standard AC outlet and have LEDs to show operation and diagnostics. The Hub may also record data, so that if the Internet connection is ever down, data from the Nodes will not be lost. It will also have the option of a tamper resistant casing and minor router capabilities—so that it could stand in front of a standard router and act as the primary data entry point for a location. The Hub will also be able to operate behind a router. All of the Hubs may connect to a centralized database for data aggregation. This database will be able to relate the information from each Node according to the time recorded. Specific data which will be saved may include: (1) Hub IP#/DNS information; (2) Node IP#/DNS information/name; (3) Timestamp increment; (4) Hot water flow by unit (gallon or liter) per time increment; (5) Electric flow by unit (kilowatts) per time increment; (6) Fuel flow by unit (depends on fuel type) per time increment; and (7) Other information as required (e.g. water temperature).

It is envisioned that the present invention provides a set of devices, a system and a method to accurately and remotely measure the utilized energy generated from Solar Hot Water (SHW) systems in real-time. Specifically, the data input from a pulse meter (which is connected to a flow meter from the hot water tank) and the data input from a Watt meter (which is connected to an electrical panel for secondary electrical heating in the hot water tank) OR another pulse meter (which is connected to a flow meter on a fuel line that serves as a secondary heating source) may be calculated and software used to combine them on a centralized server. The combined data is then used to calculate the utilized energy generated by the Solar Hot Water system by determining the total amount of energy represented by the hot water used and subtracting any secondary energy (e.g. electrical or fuel) that was also used to heat the water. With additional calculations which take into account the general starting temperature of the water entering the tank and also subtracting for any energy used for other purposes (e.g. pumping water), the system will be able to isolate the precise utilized energy generated by the renewable (i.e. solar) component of the system. This will result in an accurate measurement of the renewable energy generated and consumed for a given time-period which can then be used to monitor efficiency, determine the actual payback period of the system, qualify for incentives and carbon credits, etc.

Each installation of the Invention will have two or more Data Nodes. These are typically connected wirelessly to the Hub, and connected directly to the inputs/outputs from the Solar Hot Water system. They communicate constantly with the Hub, transferring data which the Hub then sends up to the server. They have the following properties: The first Required Node connects to a flow meter attached to the Water Tank that is connected to the Solar Hot Water system. This Node will operate as a pulse meter, 'clicking' whenever a unit (either a gallon or a liter) of hot water passes from the tank. The second Required Node connects to either the electric panel at the switch for the Hot Water tank's electric power OR to a flow/other meter for gas/oil to the secondary heater for the Hot Water tank. The Node may have a data storage means for storing flow/usage information. Together, the data gathered from these Required Node connections allow the software on the serve to convert the utilized hot water into an accurate reading of utilized solar energy by subtracting the energy required to by the secondary heating mechanism. The term utilized generation refers to the energy generated by the an at-premise power system, less any energy that has not been consumed by the at premise power system (e.g. the energy used to heat water that remains in the tank and is not subsequently used). There may also be other Nodes, which may be used to measure other aspects of the system and gain even more accurate readings. For example: the temperature of the hot water on an ongoing basis. The system may be monitored from a remote location (such as a computer in a different location).

Typically each Node connects to a specific hub. It is set up to do so through the browser interface for the Hub. The connection to the Hub is typically wireless, though these can also be connected through Ethernet wiring. Wireless transmissions between the Hub and Nodes will have data encryption. There will be the ability to create a tamper resistant casing around the Node. This is important to ensure the accuracy of the actual power utilized. The Node has two wire input areas for pulses. These, combined with the time stamp, will be sent up to the Server. The computer processor implemented server may be at a remote location. The Node also has a connection for a Watt sensor. This will have the following characteristics: The Watt sensor can handle 1-3 phase hook ups and will be compatible with clamps as well as loop sensors.

The present invention provides a computer processor implemented method of measuring utilized generation of at least one at-premise power system to a consumer, the method comprising the steps of; providing at least one at-premise renewable power system, at least one meter in communication with at least one at premise renewable power system and at least one wireless communication node in communication with at least one meter; determining the measurements from each meter, wherein at least one of the meters collects generation data from at least one at-premise renewable power system. According to a preferred embodiment, a first meter collects data input from a pulse meter to provide primary input, a second meter collects data input from a secondary source meter to provide secondary input and the step of determining utilized generation is arrived at by subtracting the secondary input from primary input. Once the data is available, the software will combine the data to calculate the utilized power from the each Solar Hot Water system that is connected via a Hub.

According to one preferred embodiment, the basic formula to calculate utilized generation for a given period is as follows:

$$util = (fl1 * temp * conv * dur) - (fl2 * dur)$$

In this formula, util is the utilized generation, or utilized power generated, by the SHW system for the period, fl1 is the flow in units of hot water from the hot water tank during the time increment (flow is the usage for a water heater, it may be other measures for different at premise power systems), temp variable is the difference between the starting temperature of the water when it enters the tank and when it leaves. In the basic conversion equation, this will be kept as a constant, but for systems with material changes in entry and exit temperature, these will be measured and included in the equation. An example of this would be for a system in which the cold water pipe entering the system is not insulated and is exposed to outdoor conditions, conv is a conversion constant variable which is the constant for converting the BTUs required to heat the water from the entry to exit temperature (or temp) into Kilowatts, dur variable is the period. This will generally be a month, though a shorter period may be chosen. The fl2 variable is the flow in units of energy for the secondary heating source. It is important to note that the calculation will be different if the secondary heating source is provided by fuel. This is recorded in the same length increments as the fl1 variable.

The method may comprise the step of calculating an equivalent amount of carbon which would have been created to generate the power utilized for at least one Period to provide a carbon deficit. A period can be any amount of time, but would typically be between one month and a year. The consumer may be offered carbon credits according to the carbon deficit.

It is envisioned that a third party may own the at-premise renewable power system. The third party owner would own the at least one at-premise renewable Power System and leases the at-premise renewable Power System to the consumer. The lease may be billed according to utilized generation.

The consumer may also pick a desired monthly payment and remotely a change may be made to the at-premise renewable power system according to the consumer's desired consumer monthly payment. The method may comprise the step of determining if the system is meeting the anticipated generation in the system's payback calculation, or if the actual generation requires the payments to be recalculated. For example, if the utilized generation of the at-premise renewable power system is less than the anticipated generation the payback calculation would also be less than anticipated and therefore the payback term would have to be extended and the value of the system altered.

The components (node (100), hub (102) and server (104) make up the required core components needed to accurately measures the actual usable output from a Solar Hot Water (SHW) system. Essentially, the hub (102) connects to multiple nodes (100) which simultaneously measure the secondary power going into the system along with the hot water going out. Controlling for any background power requirements (e.g. for pumping), it can measure the usable BTUs created by solar by analyzing the measurements at the server (104) level. It should be understood the consumer may not pay an upfront cost for the system, unlike prior art systems, the system is provided at no cost and the energy generated/utilized generation pays for the system. This is particularly viable when the operating costs are far outweighed by the upfront cost of the system. For example, a third party owner may own the at least one at-premise renewable Power System and lease the at least one at-premise renewable Power System to the consumer and/or third party financer.

It is very important to be able to measure the usable energy generated by Solar Hot Water systems (SHW systems). As the most efficient systems available by a significant margin compared to Photovoltaics (PV), Solar Hot Water system can provide high-efficiency, inexpensive power today. But not only are they less well known/publicized than PVs, it can be difficult to precisely prove their effectiveness since there are fewer ways to efficiently measure their utilized production than with PVs. This makes accurate payback calculations more difficult, and may prevent some companies from purchasing these systems. Another important reason to be able to accurately measure the utilized power from SHW systems is to benefit from incentives. While many states have general rebates for SHW system for homeowners, larger installations, which potentially have greater commercial and environmental benefits are more difficult to apply for since an easy method of accurately monitoring the usable power generated and converting it over time into kilowatt hours is not readily available. Also, this would allow the sale/trading of carbon credits from SHW systems. the ability to remotely monitor utilized energy in real time provides addition capabilities on the part of those maintaining the solar systems in terms of their ability to find issues and increase the systems' efficiency.

Once information regarding utilized generation has been generated, it may be displayed on a portal for use in the following: determining the exact utilized power generated by the SHW system for a given duration to calculate the impact of the system (and potentially its actual payback period); Calculating utilized power for monitoring and diagnostics vis-à-vis anticipated performance; Calculating power generated for incentives and carbon credits. To determine the carbon credits, the method may comprise the step of calculating an equivalent amount of carbon which would have been created to generate the power utilized for the at least one Period to provide a carbon deficit. Also, the method may comprise the step of offering carbon credits according to the carbon deficit. The step of calculating carbon deficit may take into account any energy generated. The Carbon credit Periods may start on the first of a month and end on the last day of a month. This may match the billing cycles.

The at least one at-premise renewable Power System may be a solar system, solar panel system, photovoltaic, thermal, wind powered, geothermal, hydropower or any other system. Also, the terms at-premises, on premises and at-premise are interchangeable and equivalent. Additionally, for those interested in heating and cooling their dwelling via renewable energy, geothermal heat pump systems that tap the constant temperature of the earth, which is around 7 to 15 degrees Celsius a few feet underground, are an option and save money over conventional natural gas and petroleum-fueled heat approaches. The term at premises renewable Power System does not include conventional natural gas and petroleum fueled heat.

The method may further comprise the steps of: monitoring the system from a remote location; and monitoring the utilized generation from a remote location. The method may comprise the steps of: generating an alert when the customer variables are a prescribed percentage different than historical averages. The method may also comprise the steps of monitoring and storing the consumer's customer variables and utilized generation.

It should be understood that the foregoing relates to preferred embodiments of the invention and that modifications may be made without departing from the spirit and scope of the invention as set forth in the following claims.

I claim:

1. A system for measuring the power from an at-premise renewable Power System as it is generated at a consumer's premises, said system comprising:
   at least one at-premise renewable power system provided at no cost to said consumer, wherein said at-premise renewable power system is at least partially powered by at least one alternate energy source;
   at least one meter in communication with each said at least one at-premise renewable power system, wherein said at least one meter measures usage by each said at-premise renewable power system;
   at least one data hub;
   at least one computer processor implemented data server in communication with each said at least one data hub;
   at least two communication nodes in communication with each said meter, wherein each said communication node transmits said usage to said at least one data hub, and each said at least on data hub transmits said usage to said at least one server and said at least one computer processor implemented data server calculates the utilized generation of said at-premise renewable power system and bills the consumer according to said utilized generation.

2. A system as in claim 1, further comprising at least one wireless communication node and a data storage means for storing usage information.

3. A system as in claim 1, further comprising:
   At least one secondary energy source in communication with and at least partially powering said at least one at-premise renewable power system.

4. A system as in claim 1, wherein said at least one meter is selected from the group consisting of pulse meter, temperature meter, electromechincal meter, solid state meter, flow meter, electric meter, energy meter and watt meter.

* * * * *